July 31, 1951 W. F. MARNELL 2,562,470

RECORD MACHINE SYNCHRONIZER

Filed Nov. 5, 1947

Inventor

WILLIAM F. MARNELL

By Semmes, Keegin, Robinson & Semmes

Attorneys

Patented July 31, 1951 2,562,470

UNITED STATES PATENT OFFICE 2,562,470

RECORD MACHINE SYNCHRONIZER

William F. Marnell, Chandler, Ariz.

Application November 5, 1947, Serial No. 784,232

3 Claims. (Cl. 274—10)

Figures 1, 2:
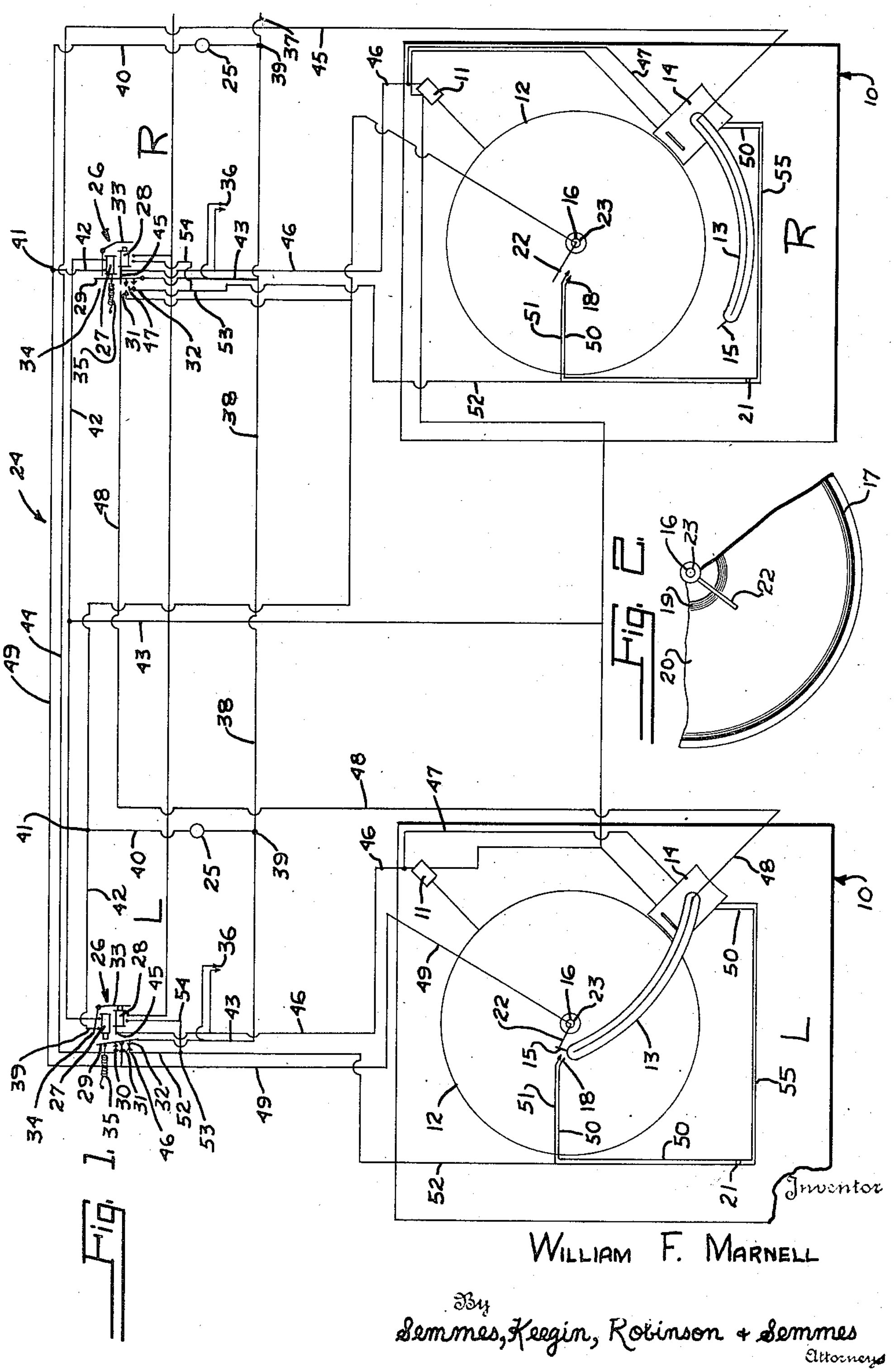

This invention relates to improvements in multiple recording and transcribing machines and has particular reference to a synchronizing system for use with sound reproducing machines such as phonographs, to reproduce disc recordings and transcriptions in such manner as to simulate a continuous performance.

It has been difficult to synchronize the playing of successive records on sound reproducing machines so that the listening audience is unaware of any change from one recording disc to another. Reproducing systems which have attempted to produce continued, uninterrupted speech, for example, employing successive records have either required special records that are unoperable on ordinary machines, or else special machine modifications and adjustments to accommodate the records. Such machines have not been able to accommodate the continuous playing of more than two records without careful manual adjustment of subsequent records on the machine. Such machines are not adapted to handle a series of records either with a pause at every change of record, or in continuous reproduction, without prior adjustment of the machine for each operation. The complexity of these machines has made it impracticable to attempt to synchronize disc recordings and transcriptions on a conventional record changer.

It is a primary object of this invention to overcome the aforementioned disadvantages and to provide a multiple recording and transcribing machine which synchronizes and effects continuous, uninterrupted playing of two or more records.

Another object of this invention is to provide a synchronizing system for a multiple record player which starts rotating a second record before the first record completes a recording or a transcription, and commences playing the second record at the moment the first record finishes playing.

Another object of this invention is to provide a record to be synchronized with the playing of a subsequent record by means of a synchronizing system including a conducting element which is positioned across the recording surface of the record, and which initiates the process of record synchronization in adequate time to effect continuous, uninterrupted operation of a sequence of records.

Another object of this invention is to provide a synchronizing system for a record playing machine which may accomplish uninterrupted continuity of playing with a sequence of records, or may accomplish the normal unsynchronized playing of individual records, without adjustment of the machine.

Another object of this invention is to provide a synchronizing system for record playing machines which may be operated to synchronize the playing of successive records, or to synchronize the playing of the opposite side of the same record, with no interruption in playing sequence.

Another object of this invention is to provide a record synchronizing system which may readily be adapted to use with a conventional record player and changer.

Another object of this invention is to provide a disc record operable on conventional record playing machines provided with automatic record changing mechanism, which enables synchronization of play with succeeding records in a series when played on a record machine equipped with the synchronizing system of the invention.

Other objects and advantages of the invention will be apparent from the following detailed description thereof, which is set forth for the purpose of fully explaining the invention in all of its ramifications and is not to be regarded as necessarily limiting the scope of the invention. Reference is made to the accompanying drawings, wherein:

Figure 1 is a diagrammatic illustration of the invention as applied to a record playing machine comprising two identical, conventional record playing and changing units; and Figure 2 is a top view of a record prepared in accordance with the invention.

In its broadest concept, this invention embodies new and improved means for synchronizing sequential operation of two or more recording or transcribing machines so as to provide continuous, uninterrupted speech or music from a series of records. These means include a conducting element fixed in a predetermined position on a phonograph record in order to close an electrical circuit between the pick-up needle and the turntable of a first record playing machine before the machine has finished operating, thus to operate a second record playing machine to initiate transcription or reproduction of its record at the exact moment that the first record playing machine finishes transcribing or recording.

In the drawings, the invention is shown as applied to two similar conventional record playing units designated as L and R, including in each instance a cabinet 10 with a turntable motor 11. Each installation also includes a record turntable 12 and a tone arm 13, which swings between a playing and an at rest position on a record changing support 14, the two positions being shown in units L and R respectively. A needle 15 having conductive qualities is provided for each tone arm. An offset record spindle 16 carries a supply of records 17 to be dropped from the usual magazine position into playing position on the turntable 12 when the tone arm 13 returns to its normal resting place.

An eccentric groove switch 18 is provided in each cabinet 10 to actuate the record changer 14 for purposes of lifting the tone arm 13 to return it to its normal resting place. Eccentric grooves 19 conventionally are carried on a disc record at a point inwardly of the transcription grooves or playing surface 20 and when the tone arm 13 is carried by play of the record to the eccentric grooves 19 by the needle 15, the eccentric switch 18 is thrown. After the tone arm 13 is returned to its normal resting place, a following record is dropped from the record magazine on the spindle 16 onto the turntable 12 and the tone arm 13 swings over and down onto the record to repeat the playing operation. A reject button 21 is shunted across each eccentric groove switch 18, and serves to reject a selected record from transcription. No matter at what point of record play this button may be pressed, operation thereof has the same effect on the record playing machine as if the needle 15 of the tone arm 13 had reached the eccentric grooves at the end or inner periphery of the record. A following record 17 subsequently is substituted in its place, and played.

According to the present invention, each record which is to be followed by another record in uninterrupted playing sequence, is provided with a synchronizing strip comprising a conductor shown as 22. The records may be prepared conveniently with a locating jig (not shown), which is laid upon the record blank so that it extends from the center of the blank to a desired point on the recording face of the disc. The conductor 22, preferably a strip of gold leaf, is laid in this jig and deformed into the record grooves 20 forming a part thereof. The width of the conductor 22 will depend upon the speed of energization desired in the associated electrical circuit of which it is a part. The location of this predetermined point for positioning the outer terminus of the conductor 22 will be explained more fully hereinafter. After the conductor strip or gold leaf 22 is located, the jig is removed and the record is pressed in the usual manner. The thin gold leaf 22 assumes the contour of the impressions of the transcription at that part of the record which the leaf crosses. The hole in the center of the record disc is provided with a metal eyelet 23 pressed therein, to carry the circuit from the gold leaf 22 to the spindle 16. The gold leaf 22 may be electroplated with copper or other suitable metal, to impart thereto the same wearing qualities as the material from which the record disc is made and increase the conductive qualities of the strip 22.

In determining the point on a record disc to which the synchronizing strip 22 should extend, certain time factors must be considered. For example, it takes a predetermined time for a tone arm 13 and needle to move from the normal resting place in a record cabinet (see unit L) to a point of reproduction of sound on a record, during which time the turntable motor is attaining a normal speed. Secondly, a point may be located on a preceding record from which it takes the same time to play to the end of the record from this point, as the time required to start the next recording. Accordingly, the synchronizing strip 22 is laid from such a point on a record 17 and extends inwardly to contact the center eyelet 23 thereof. Thus, an electrical circuit can be closed between the needle 15 of the tone arm 13 and a contact through the center eyelet 23 of the record in time to actuate a second record machine so that its record will play in perfect synchronization with the termination of play of the first record.

The electrical circuits for accomplishing automatic sequential performance include an electrical system 24 formed in the two cabinets 10. Within this system are starter buttons 25, one for each cabinet. Starter buttons 25 are provided so that the playing machines are operated in correct order, i. e., the turntable with the first record to be played thereon should start first, and therefore its corresponding starter button 25 will be pushed. Once the record machines have been started, depending on whether or not the records are prepared for synchronized operation, the machines will continue to operate in the proper order either by means of the eccentric groove switch 18 or the synchronizing control system which will now be fully explained.

The synchronizing control system includes a mechanical lock-in, electrical release relay 26 for each cabinet 10. Each relay 26 comprises a contact coil 27 and a release coil 28. A main contact arm 29 opens and closes three circuits at three interlock contacts 30, 31, and 32 when the arm 29 is opened by the contact coil 27. A contact release arm 33 is constructed to form a mechanical locking means to secure the contact arm 29 once it is drawn back by the contact coil 27. The release arm 33 is provided with an extension 34 which operates to secure or release the contact arm 29, permitting a spring 35 to swing the contact arm 29 outwardly and close the contacts 30, 31, and 32, whenever an electric impulse energizes the coil 28 to draw the arm 34 up out of contact with the arm 29.

The switch assembly of the player unit designated by the letter L shows the arms 33 and 34 out of contact with the main contact arm 29, the latter closing the circuits incident to the contacts 30, 31 and 32 under the tension of the spring 35. The switch assembly of the player unit designated by the letter R shows the arm 33 in closed position, mechanically locking the main contact arm 29 from contact with the contacts 30, 31, and 32.

A limit switch 36 is associated with each player cabinet 10 and is placed in the electrical system so that it opens when the corresponding tone arm 13 returns to its normal resting place, as shown on the unit R, and not before. Each switch 36 maintains power on in the circuits of the cabinet with which it is associated in order to continue operation of the turntable against the action of groove switch 18 or the synchronizing strip 22 on the record, until the tone arm 13 returns to its normal resting place whereby the limit switch 36 is opened and the turntable motor 11 is deenergized. This ensures that a change of record will be accomplished by the record changer 14 before play of the record on the associated turntable 12 is completed. With a new record in position, the turntable motor 11 shut off, and the tone arm 13 in its normal resting place, the cabinet is ready to commence operation when the necessary circuits are energized by completion of playing of the record in the associated cabinet 10.

If the record in the operating cabinet 10 has been prepared for synchronous operation with subsequent records by inclusion of the gold leaf contact 22 thereon, when the needle 15 of the tone arm 13 touches the synchronizing strip 22 on that record, the contact coil 27 on the relay 26 of the nonplaying cabinet will be energized, initiating rotation of its turntable and play of the record by circuits to be described.

The electrical circuits for energizing the system include a source of current 37, and a wire 38 leading through terminals 39 to wires 40 leading through the starter button 25 to terminals 41. Wires 42 lead from terminals 41 to contact coils 27 of the relays 26. Also, wires 43 lead out of the wire 38 to the contact arms 29.

When the contact arms 29 are in the open position, as shown in player unit L, current passes through the contact 30 through a wire 44 to the tone arm 13 on the player unit R, the current passing to the needle 15. When the source of current 37 is cut into the circuit and the starter button 25 of player unit L is depressed to initiate a playing operation, actuating coil 27 of the relay 26 pulls the contact arm 29 out of contact with the contact 30, cutting out the circuit leading to the needle 15 of player unit R, and the contact arm 29 closes a circuit with a contact 45, energizing the motor 11 of the player unit L through wires 46 and simultaneously supplying current through wires 47 for the record changing mechanism 14, lifting the tone arm 13 and moving it from at rest position to playing position at the starting grooves of the record 17.

With the player unit L thus in operation, in the player unit R, the contact arm 29 of the relay 26 rests upon the contact 30, supplying current from the source wire 38 through the contact arm 29 to the contact 30 through a wire 48 leading to the tone arm 13 and needle 15 of the player unit L.

When the needle 15 of the player unit L, thus energized, contacts the synchronizing strip 22 on the record 17 being played, an electrical impulse passes through the record eyelet 23 to the record spindle 16 to a wire 49 leading to the coil 27 of the relay 26 in unit R, pulling the contact arm 29 into closed position and mechanically locking it in place with the extension 34 of the contact release arm 33. This disconnects wires 38 and 48 at the contact 30, preventing repeated passage of impulses from the tone arm 13 and the needle 15 of the player unit L, as the needle subsequently contacts the synchronizing strip 19 as the record rotates. At the same time, the contact arm 29 connects the wire 38 and the wire 46 at the contact 45 of the unit R, thus energizing the turntable motor 11 of the unit R and sending current through the wire 47 to the pick-up actuator and record changer 14, moving the tone arm 13 to the starting grooves of the record on the unit R turntable.

At this time, the relays 26 in both units L and R are closed, and both turntables 12 are in operation. The record being played on unit L is nearing completion, and the play of the record on unit R is just commencing. Due to the operational time factor established by proper positioning of the synchronizing strip 22 on the record in unit L relative to the time necessary for movement of the tone arm 13 in unit R to playing position and the start of the music or speech on the record on the unit R, at the exact instant the play of music or speech for example, ends on the unit L, transcription will start on the record on the unit R.

The needle 15 on the tone arm 13 in unit L then passes to the eccentric grooves of the record to actuate the eccentric groove switch 18, sending current over wires 50 and 51. The wire 50 leads to the pick-up actuator 14 which operates through the usual solenoid provided to raise the tone arm 13 from the record and return it to normal resting place. The switch 18 also sends current through the wire 51 over a wire 52, a terminal 53 and a wire 54 to the release coil of the relay 28, releasing the contact arm 29 to the action of the spring 35, drawing the contact arm to the open position. Thus, the circuit comprising wires 43 and 46 is broken at the contact 45, stopping the motor 11, and the circuit of wires 38 and 43, the contact 30 and the wire 44 reestablished, again sending current to the tone arm 13 and the needle 15 of the unit R, in preparation for synchronization.

It will be noted that the opening of the relay 26 in unit L by the eccentric groove switch 18 does not stop rotation of the turntable 12 or operation of the pick-up arm 13. This is accomplished only by return of the tone arm 13 to normal resting position, operating the limit switch 36, to remove the shunt across the wires 43 and 46, as previously described. This ensures proper placement of the next record of the series to be played on the turntable 12, and the unit L thus prepared, waits for the needle 15 of the unit R to contact the synchronizing inlay 22 on its record to send current to again close the relay 26 of the unit L, connecting the wires 43 and 46 to initiate operation of the motor 11 and tone arm 13 of the unit L. With the preestablished time relation between the initiation and termination of record play in the two respective units L and R, through the synchronizing strips 22, the continuous, sequential transcription of records is maintained.

The synchronizing system of the invention operates without change, in connection with playing a series of records which have not been impressed with the synchronizing strip 22, where a lapse of time between the playing of individual records is desired. In this case, assuming the unsynchronized record 17 to be on the unit L, the record carries the tone arm 13 to the inner eccentric grooves, actuating the eccentric groove switch 18, thus energizing the solenoid in the pick-up and record changing mechanism 14 to return the tone arm 13 to the normal resting position. Simultaneously, current passes from the wire 50 to the wires 52 and 54 to the operating coil 28 which opens the relay 26, disconnecting the wires 43 and 46, and reconnecting the wires 38 and 44 and the interlock contacts 30, 31, and 32. Thus, the wires 52 and 49 are connected, relaying current to the actuating coil 27 of the relay 26 of non-operating unit R, closing the relay to initiate playing of the record on the unit R turntable at the same time the turntable on operating unit L is shut off. Thus, a lapse occurs between transcriptions, in time length equal to the time it takes for the needle 15 to reach and operate the eccentric groove switch 18, plus the time it takes for the needle 15 on the other unit to traverse the starting grooves on the record.

It should be noted that if the relay 26 for the unit R, for example, were closed at the time the starter button 25 for the unit L were pressed, to initiate operation of the unit L turntable, both units L and R will operate simultaneously. This may occur when operation of the machine is terminated leaving the relay 26 closed on the turntable employed to play the last record of the series. In such case, operation of the turntable in unit R may be terminated by pressing the reject button 21, which shunts across the wires 50 and 55, opening the relay 26 in question and preparing the unit R for normal synchronized operation in response to impulses received from operation of the unit L.

It will be observed that with modification of the components of conventional record machines in accordance with the invention, two record turntables will accommodate approximately twenty twelve inch records, ten on each turntable, for sequential operation. Thus, if the transcriptions pressed on the records are cut for six minutes of playing time, two hours of uninterrupted synchronized reproduction may be accomplished, without operator supervision.

With conventional phonograph records, it is possible for a record to be as much as one whole revolution out of coincidence with other records, of a series, depending on how a particular record is positioned on the record turntable by the operator. To eliminate this difficulty, it has been suggested that tick marks may be placed on the records and a corresponding guide mark placed on the record turntable which, when aligned, would tend to eliminate out of sequence operation of any component record of the transcription series. It will be noted that when records are prepared according to the system of synchronization of the invention, no such problem is presented, for the recording units L and R operate continuously and in timed sequence regardless of how the individual records are set on the turntables.

The synchronizing system of this invention may be readily adapted to use with recording machines which rotate records in suspension either on the periphery or the axis of the record, or both. With these adaptations, two tone arms may be utilized for each record turntable, one tone arm being held by gravity on the top of the record, the other tone arm when it comes into use, being held up against the bottom of the record by such means as a spring or counterweight. Thus, if the continuation of a particular record is on the opposite side thereof, the record may be played without interruption in the speech or music sequence, the bottom tone arm being brought into operation in the same manner as the tone arm employed with a separate record playing unit, as described.

It is observed that conventional records are pressed out with the grooves on either side pressed out in opposed relationship, for obvious reasons. Thus, to provide a continuous record production on a machine carrying the records in suspension, the record must be modified by reversing the direction of the grooves on the under side thereof.

The objects and advantages of the invention are achieved with a simply and inexpensively constructed system, which may be installed with few modifications and adjustments on any conventional multiple record playing machine. Furthermore, record playing machines equipped with the system of this invention are equally adaptable for use with records not pressed for synchronous operation in a continuous series, thus eliminating the waste and expense incident to investment in new record playing machines with specially prepared or new sets of records.

It will be apparent that various modifications may be made in the invention as disclosed without departing from the spirit thereof, and it is to be understood that the invention is to be limited only as described in the appended claims.

I claim:

1. In an electric record playing machine, two record turntables, a tone arm for each turntable including a pick-up having a needle, an electric motor for each turntable, a record for each turntable including a center hole, a contact eyelet defining the center hole, a conducting strip on said record following the vertical or lateral transcribed impressions in the groove of a disk recording and extending between a predetermined point on the recording surface of each record and said eyelet, said strip forming a part of the record surface, said strip carrying an electrical impulse from the needle on the tone arm upon contact to the said eyelet and thence to energize a circuit initiating rotation of a succeeding turntable and record.

2. In an electric record playing machine having a plurality of turntables provided with record spindles, a tone arm for each turntable including a pick-up having a needle, an electric motor for rotating each turntable, circuits for operating the motors to rotate the turntables sequentially, a plurality of recordings for the turntables adapted to be played in continuous and uninterrupted series, and circuit means for controlling the sequence of operation of the turntable comprising an electrically conductive eyelet defining a center hole in each record for receiving the turntable spindle, and a conducting strip formed on the surface of each record and following the contours of the grooves on the record surface, the said conducting strip extending between the predetermined point on the playing surface of the record and connecting with said eyelet.

3. In a playing record used for sound reproduction and having a center hole for positioning of the record on the locating spindle of a turntable of a record player, means for establishing an electric circuit between the needle of the player tone arm and the turntable spindle comprising conducting material formed as a part of the playing surface of the record and following the contour of the grooves thereon to provide an uninterrupted playing surface for travel of the tone arm needle, and an electrically conductive eyelet mounted in the center hole of the record for engagement with the turntable spindle, the conducting element in the record surface extending from the predetermined point on the playing surface of the record to the said eyelet.

WILLIAM F. MARNELL.

REFERENCES CITED

The following references are of record in the file of this patent:

UNITED STATES PATENTS

| Number | Name | Date |
|---|---|---|
| Re. 18,951 | Strom | Sept. 12, 1933 |
| 1,126,377 | Brophy | Jan. 26, 1915 |
| 1,265,502 | Peal | May 7, 1918 |
| 1,780,414 | Andres | Nov. 4, 1930 |
| 1,834,886 | Barton | Dec. 1, 1931 |
| 2,042,228 | Huenlich | May 26, 1936 |
| 2,231,517 | Andres | Feb. 11, 1941 |
| 2,409,006 | Yerkovich | Oct. 8, 1946 |

FOREIGN PATENTS

| Number | Country | Date |
|---|---|---|
| 506,407 | Great Britain | Aug. 20, 1937 |